United States Patent [19]

Takahashi et al.

[11] 4,047,728
[45] Sept. 13, 1977

[54] CORRECTION DEVICE IN A POWER STEERING APPARATUS FOR VEHICLES

[75] Inventors: Noriyuki Takahashi, Tokyo; Kimio Miura, Saitama, both of Japan

[73] Assignee: Honda Giken Kogyo Kabushiki Kaisha, Tokyo, Japan

[21] Appl. No.: 693,264

[22] Filed: June 4, 1976

[30] Foreign Application Priority Data

July 1, 1975 Japan .................. 50-81617

[51] Int. Cl.$^2$ ............................ B62D 5/08
[52] U.S. Cl. ............................ 180/141
[58] Field of Search ............ 180/141, 142, 143; 60/464

[56] References Cited

U.S. PATENT DOCUMENTS

| | | | |
|---|---|---|---|
| 2,487,618 | 11/1949 | Tivyman | 180/143 |
| 2,902,104 | 9/1959 | Schilling | 180/141 |
| 2,939,470 | 6/1960 | Kohr | 180/141 X |
| 3,552,517 | 1/1971 | Nordeen | 180/141 |

*Primary Examiner*—Joseph F. Peters, Jr.
*Assistant Examiner*—R. Schrecengost

[57] ABSTRACT

A correction device in a vehicle power steering apparatus adapted to effectively utilize the aiding effect of a hydraulic power cylinder depending upon travelling speeds of the vehicle. A change in value of rightward or leftward acceleration resulted from the turning of the vehicle is sensed by a weight oscillatably received within a closed oil chamber of the correction device to allow the operator to perceive an adequate steering resistance, thereby avoiding his erroneous steering. The correction device includes stoppers positioned at tip surfaces of nozzle members to provide a desired clearance between an end surface of a pressure restriction plate and the nozzle member thus allowing oil in the nozzle to flow. The device further includes compression springs retained between the weight and the casing for biasing the weight towards its neutral position, the compression spring engaging an adjusting screw to predetermine a value of lateral acceleration of the vehicle.

3 Claims, 2 Drawing Figures

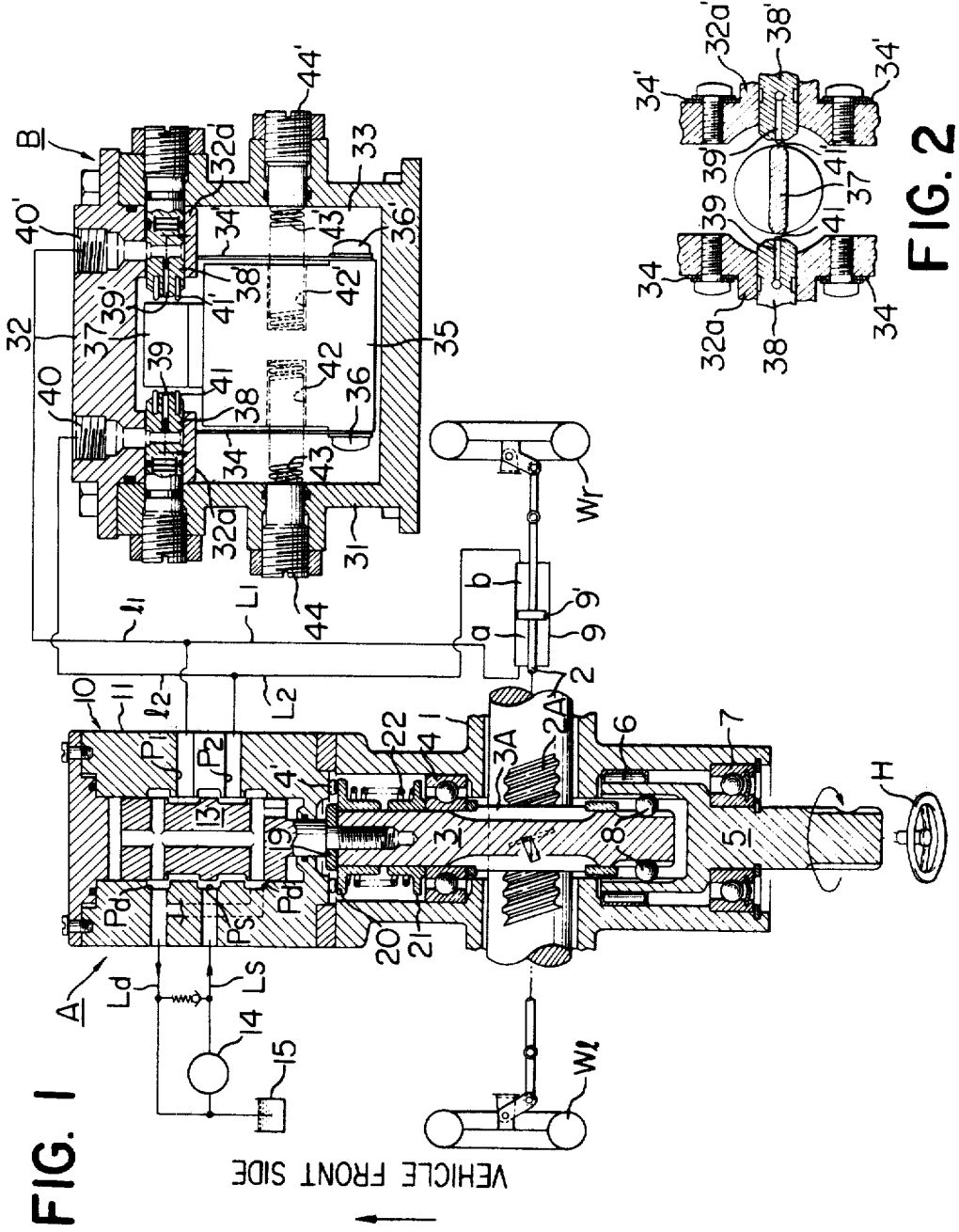

CORRECTION DEVICE IN A POWER STEERING APPARATUS FOR VEHICLES

BACKGROUND OF THE INVENTION

1. Field of the Invention

This invention relates to a correction device in a power steering apparatus for vehicles such as automobiles, in which the operator's steering force is assisted by a hydraulic power cylinder.

2. Description of the Prior Art

Generally stated, as travelling speed of vehicles increases, the steering resistance decreases and the steering response becomes more sensitive, as a consequence of which the unskilled operator sometimes tends to erroneously drive the vehicle, when the latter is being travelled at a high speed, resulted from his excessive operation of the steering handle. The aforementioned power steering apparatus that may lightly manage the handle operation shows a marked tendency noted above.

SUMMARY OF INVENTION

Therefore, the dangerous tendency noted above is overcome by the present invention which provides a novel correction device in a proper steering apparatus described above, wherein a lateral acceleration of the vehicle resulted from the steering is sensed and is then fed back as a correction signal to a hydraulic system of the steering power cylinder whereby an output of the power cylinder is automatically decreased in response to an increase of the lateral acceleration so that at the time of high speed travelling, the operator be allowed to sufficiently perceive the steering resistance whereas when the vehicle is being travelled at a low speed or is stopped, the power effect of the power cylinder may effectively be utilized.

BRIEF DESCRIPTION OF THE DRAWINGS

The above and other objects and features of the invention will appear more fully hereinafter from a consideration of the following description taken in connection with the accompanying drawings wherein one example is illustrated.

FIG. 1 is a longitudinal sectional top view of power steering apparatus for an automobile and including a transverse sectional front view of a correction device; and FIG. 2 is a sectional view taken on line III-III of FIG. 1.

DESCRIPTION OF THE PREFERRED EMBODIMENT

Referring now to the drawings in detail, an automobile power steering apparatus is generally designated by the reference character A, and a correction device by the reference character B. First, a description will be given of a construction of the apparatus A, in which a steering gear case 1 fixedly mounted on a vehicle body (not shown) is interiorly provided with a rack rod 2 laterally slidably supported therein, the rack rod 2 being disposed between right and left wheels Wr and Wl, respectively. In the midst of the rack rod 2, there is formed a power cylinder 9, of which interior is partitioned by a working piston 9' formed integral with the rack rod 2 into a first and second working oil chambers $a$ and $b$.

Perpendicularly intersecting with respect to the rack rod 2 is a pinion shaft 3 of which upper end is rotatably and slidably supported on the steering gear case 1 though ball bearings 4. The rack rod 2 and pinion shaft 3 are formed with angular-toothed rack 2A and pinion 3A, respectively, which are brought into engagement with each other. A handle shaft 5 extending to a steering handle H is rotatably supported at the rear of the steering gear case 1 through bearings 6 and 7, and the rear end of the pinion shaft 3 is connected to the fore end of the handle shaft 5 through ball joints 8, which allow only the axial sliding of the pinion shaft.

Disposed adjacent the fore end of the steering gear case 1 is a valve box 11 for a control valve 10, the valve box 11 receiving therein a spool valve 13 connected to the fore end of the pinion shaft 3. Opened internally of the valve box 11 are an annular oil feeding port Ps, a pair of adjacent second output ports $P_1$ and $P_2$ arranged opposedly thereof, and a pair of adjacent annular oil removing ports Pd arranged similarly opposedly thereof so that a land portion of the spool valve 13 is moved along these adjacent ports to thereby provide a communication and cut-off therebetween.

The oil feeding port Ps is connection to a hydraulic pump 14 through an oil feeding flow passage Ls, the first and second output ports $P_1$ and $P_2$ connected to the first and second working oil chambers $a$ and $b$, respectively, in the power cylinder 9 through a first and second output flow passages $L_1$ and $L_2$, respectively, and the oil removing port Pd connected to an oil reservoir 15 though an oil removing flow passage Ld.

A pair of spring seats 20 and 21, which mutually restrict axial displacement between the ball bearings 4 and a stopper 19, are fitted at the fore end portion of the pinion shaft 3, and a return spring 22 is retained in compressive fashion between the seats and a thrust bearing 4' is interposed between the spring seat 20 supported on the stopper 19 and the valve box 11.

Next, a description will be given of a construction of the correction device B. The device has a casing 31, which is secured to a suitable portion of the vehicle body not shown, the casing interiorly formed with an oil chamber 33 that may be closed by a cover 32. At the lower surface of the cover 32 there are extended a pair of depending portions 32a and 32a' symmetrically to left and right. A lower portion of a weight 35 is fastened by bolts 36 and 36' to the lower ends of a pair of leaf springs 34 and 34' secured to the depending portions 32a and 32a'. Thus, the weight 35 is suspended from the cover 32 through the leaf springs 34 and 34' so that the weight may oscillate within the oil chamber 33 in the lateral direction of the automobile.

The weight 35 is upwardly formed with a pressure restriction plate 37 in integral therewith, which laterally extends and of which opposite end surfaces are in the form of a perpendicular surface having a narrow lateral width.

A pair of left and right nozzle members 38 and 38' are disposed on the upper side wall of the casing 31 and the depending portions 32a and 32a' horizontally extending therethrough and opposing each other. Nozzles 39 and 39' opening to tip surfaces of the nozzle members 38 and 38' are in communication with openings 40 and 40', respectively, vertically formed in the cover 32, the openings 40' and 40 being connected to passages $1_1$ and $1_2$ branched from the first and second output flow passages $L_1$ and $L_2$, respectively.

The nozzle members 38 and 38' have stoppers 41 and 41' protruded from the tip surfaces thereof adjacent the nozzles 39 and 39', respectively, and the nozzle members 38 and 38' are so positioned that when the weight 35 is in its neutral position, a given clearance is formed between each of the stoppers 41 and 41' and each of end surfaces of the pressure restriction plate 37.

Compression springs 43 and 43' each has one end retained in each of receiving holes 42 and 42', which are open to opposite sides at the lower portion of the weight 35, and the pressure of these compression springs may be adjusted by adjusting screws 44 and 44' oppositely disposed at the lower portion of the casing 31 to thereby predetermine the value of lateral acceleration of the vehicle to be sensed by the weight 35.

The apparatus described above operates as follows: In the illustrated embodiment, the handle H is shown held in a neutral position, and the return spring 22 is fully stretched between the spring seats 20 and 21 so as to hold the pinion shaft 3 and hence the spool valve 13 in its neutral position. With this, fine annular orifices are equally formed between the adjacent ports Pd, $P_1$, Ps, and $P_2$ by the presence of peripheral edges of the land portions of the spool valve 13 so that both the working oil chambers $a$ and $b$ in the power cylinder come in communication with the oil feeding and removing flow passages Ls and Ld under the same conditions to produce no difference in pressure therebetween to thereby render the power cylinder 9 inoperative.

When the steering handle H is now operated to turn the handle shaft 5 rightwards as indicated by the arrow in order to turn the vehicle rightwards, the pinion shaft 3 causes the rack rod 2 to drive leftwards, and at the same time, a reaction force of the rack rod 2 resulted from the steering resistance is resolved as shown at the angular-toothed surface of the pinion 3A in engagement with the rack 2A so that the component of force directed ahead of the pinion shaft 3 causes the pinion shaft 3 to move forward while compressing the return spring 22 through the ball bearing 4 and the spring seat 21. When the spring load described above and the thrust of the pinion shaft 3 or a part of steering resistance are balanced, the pinion shaft 3 stalls, but forward movement of the spool valve 13 resulted from the forward movement of the pinion shaft 3 results in an increase of opening of the annular orifices formed between the fore output port $P_1$ and the fore oil removing port Pd and between the rear output port $P_2$ and the oil feeding port Ps, respectively, as a consequence of which the majority of pressure oil discharged from the hydraulic pump 14 flows into the second working oil chamber $b$ in the power cylinder 9 through the second output flow passage $L_2$ and concurrently the oil within the first working oil chamber $a$ circulates into the oil reservoir 15 through the first output flow passage $L_1$ so that the working piston 9' is actuated by the high pressure of the second working oil chamber $b$ to move the rack rod 2 leftwards and to turn the wheels Wl and Wr rightwards.

The pressure oil to be fed to the second output flow passage $L_2$ partly flows into the left-hand nozzle member 38 through the branch flow passage $l_2$ and thence enters the oil chamber 33 through the nozzle 39, and on the other hand, the surplus oil in the chamber 33 circulates into the oil reservoir 15 from the nozzle 39' of the right-hand nozzle member 38' through the branch flow passage $l_1$ and first output flow passage $L_1$. Since the emission pressure of oil from the nozzle 39 acts on the left end surface of the pressure restriction plate 37, the plate 37 is moved rightwards together with the weight 35 from its neutral position against the spring force of the right-hand compression spring 43' so that the right end surface of the plate 37 may bear against the stopper 41' of the right-hand nozzle member 38' to thereby close the nozzle 39' at its minimal opening. In this case, therefore, the outflow of oil from the nozzle 39' or the emission thereof from the nozzle 39 may be controlled to be minimized so that the oil pressure of the second working oil chamber $b$ in the power cylinder 9 will not largely be reduced, whereby the power cylinder 9 may provide a great output.

When the vehicle is turned rightwards to increase a rightward acceleration thereof to a level in excess of a certain value accordingly, the weight 35 will sense it and move towards the neutral position along with the pressure restriction plate 37 to open the nozzle 39' once closed, as a consequence of which the emission of oil from the nozzle 39 increases, and the weight 35 stalls when the oil emission pressure of the nozzle 39, the strength of stability of the compression spring 43', and the inertia force due to the acceleration of the weight 35 are in a state of equilibrium. Consequently, the oil pressure of the second chamber $b$ in the power cylinder 9 is decreased to reduce the aiding effect of the power cylinder 9 so that the operator may perceive an adequate steering resistance.

Also, in the case where the handle shaft 5 is rotated leftwards, the same holds true for the aforementioned operation with the only exception that the relevant members are operated in the opposite direction. Thus, whenever the turning direction is changed, the flowing direction of oil in the pair of nozzle members 38 and 38' is alternately changed, whereby the interior of the nozzle members 38 and 38' are automatically cleaned, to particularly prevent the small-diameter nozzles 39 and 39' from being blocked by the presence of foreign matter such as dust invaded into oil. Furthermore, since the pressure restriction plate 37 as it oscillates will never completely block the nozzles 39 and 39' because of the spacing maintaining function of stoppers 41 and 41' of the nozzle members 38 and 38', respectively, the oil flow within both the nozzle members 38 and 38' will not be stopped during the steering operation to thereby avoid an occurrence of hysteresis in the emission and outflow of oil from the nozzles 39 and 39' which vary in response to the oscillation of the pressure restriction plate 37.

If the hydraulic system fails, as a consequence of which pressure oil may not be supplied to the power cylinder 9, the handle shaft 5 may be rotated to cause the pinion shaft 3 to slidably move by the reaction force from the rack rod 2 side so that the inner ends of the pair of spring seats 20 and 21 come in contact therewith, after which a turning effort of the pinion shaft 3 is transmitted to the rack rod 2 without modification, whereby the rack rod 2 may manually be operated.

From the foregoing, it will be appreciated that the present invention affords various effects as follows: The invention provides an arrangement wherein a lateral acceleration of the vehicle is fed back to a hydraulic system of a steering power cylinder 9 by a correction device B so that pressure of pressure oil supplied to the working oil chambers $a$ and $b$ in the power cylinder 9 may be reduced in response to an increase in the lateral acceleration, and therefore, when the vehicle is travelled at a high speed, which is a mode quickly responsive to steering, the aiding effect of the power cylinder 9 decreases or becomes zero to impart a sufficient steering feeling to the operator, thus preventing an excessive operation of the steering handle, whereas when the vehicle is travelled at a low speed or stopped, the aforementioned aiding effect of the power cylinder 9 may effectively be utilized to provide a good driving. In addition, since the correction device B includes no mechanical sliding part, there is no possibility that the response performance with respect to acceleration is worsened or any failure occurs as a result of invasion of a mixture such as dust in the working oil into movable parts. Furthermore, since the flow direction of oil is varied whenever the steering direction changes, the oil passages and the nozzles 39 and 39' of the nozzle members 38 and 38' may be flushed with the oil itself to thereby prevent an occurrence of a serious situation where the operation responsive to the acceleration to be sensed is hard to be effected because the nozzles or the like are blocked by the mixture such as dust in the working oil.

What is claimed is:

1. A correction device in a power steering apparatus for vehicles with a flow passage connecting a pair of working oil chambers partitioned by a working piston within a steering power cylinder to a source of oil pressure such as a hydraulic pump, said flow passage including a control valve for selectively controlling and supplying pressure oil from said oil pressure source into said pair of working oil chambers in response to rotative operation of a steering handle, the improvement comprising: a weight that may be oscillated in a lateral direction of the vehicle and is received in a closed oil chamber within a casing suitably mounted on the vehicle, a pair of left and right nozzle members with extreme nozzles thereof arranged opposite each other and disposed in said casing and leaving a desired clearance in opposite end surfaces of a pressure restriction plate formed integral with said weight, said nozzle members being internally brought into communication with said pair of working oil chambers respectively, within said power cylinder, stoppers disposed at tip surfaces of said nozzle members, said stoppers controlling the lateral oscillation of said pressure restriction plate to form a desired clearance between each of said opposite end surfaces and each of said nozzles.

2. A correction device in a power steering apparatus for vehicles with a flow passage connecting a pair of working oil chambers partitioned by a working piston within a steering power cylinder to a source of oil pressure such as a hydraulic pump, said flow passage including a control valve for selectively controlling and supplying pressure oil from said oil pressure source into said pair of working oil chambers in response to rotative operation of a steering handle, the improvement comprising: a weight that may be oscillated in a lateral direction of the vehicle and is received in a closed oil chamber within a casing suitably mounted on the vehicle, a pair of left and right nozzle members with extreme nozzles thereof arranged opposite each other and disposed in said casing and leaving a desired clearance in opposite end surfaces of a pressure restriction plate formed integral with said weight, said nozzle members being internally brought into communication with said pair of working oil chambers respectively, within said power cylinder, compression springs adapted to bias said weight towards its neutral position and retained between said weight and said casing, and a spring pressure adjusting screw connected to one end of each compression spring so that the value of lateral acceleration of the vehicle resulting from the lateral oscillation of the weight may be predetermined.

3. A power steering apparatus for a vehicle comprising a power cylinder having a pair of working chambers defined therein by means of an output piston on the opposite sides thereof, a source of fluid pressure, a fluid reservoir, and a control valve interposed in a pair of low and high pressure fluid lines connecting said power cylinder chambers with said source of fluid pressure and said fluid reservoir, said valve being operable to selectively place said power cylinder chambers into fluid communication with said pressure source and said reservoir, respectively, and a correction device connected with said respective power cylinder chambers for correcting power cylinder output in response to lateral accelerations of the vehicle, said correction device comprising: a casing mounted on the vehicle body and having a single closed chamber defined therein, a weight disposed centrally within said casing chamber for free movement in a lateral direction of the vehicle, a pressure restriction plate integrally formed with said weight, and a pair of nozzle members connected to said respective chambers of said power cylinder and disposed in said casing in laterally aligned opposite relation to each other, said nozzle members having their nozzle openings facing with the laterally opposite side faces of said pressure restriction plate normally at an equal spacing therefrom, whereby when the vehicle in motion is steered to turn, said weight is first moved laterally from its neutral position toward one of said nozzle members due to the pressure fluid ejecting from the nozzle opening of the other nozzle member against the associated lateral side face of said pressure restriction plate to restrict the flow of pressure fluid discharged from said casing chamber through said one nozzle member and then caused under a centrifugal force to move back in the reverse direction against the force of the pressure fluid acting thereon to a point of equilibrium, at which said centrifugal force and said force of the pressure fluid become balanced each other, thereby enlarging the spacing between said one nozzle member and the associated side face of said pressure restriction plate so that a part of the pressure fluid fed to one of said power cylinder chambers through said control valve, is by-passed therefrom to said reservoir by means of said correction device at a flow rate proportionate to the magnitude of the vehicle lateral acceleration sensed by said weight.

* * * * *